United States Patent [19]

Denney

[11] Patent Number: 5,092,538

[45] Date of Patent: Mar. 3, 1992

[54] MOUNTING SYSTEM FOR TWO CYCLE IN-LINE ENGINE

[76] Inventor: Larry D. Denney, 713 Vista Ter., Nampa, Id. 83686

[21] Appl. No.: 679,678

[22] Filed: Apr. 2, 1991

[51] Int. Cl.$^5$ ............................................. B64D 27/00
[52] U.S. Cl. ...................................... 244/54; 248/554; 248/557
[58] Field of Search .................... 244/54, 55; 248/554, 248/555, 556, 557

[56] References Cited

U.S. PATENT DOCUMENTS

| | | | |
|---|---|---|---|
| 1,723,768 | 8/1929 | Burnelli | 248/555 |
| 2,241,139 | 5/1941 | Julian | 248/557 |
| 4,398,684 | 8/1983 | Von Ruden | 244/54 |
| 4,531,694 | 7/1985 | Soloy | 244/54 |
| 4,982,914 | 1/1991 | Eickmann | 244/54 |

Primary Examiner—Joseph F. Peters, Jr.
Assistant Examiner—Christopher P. Ellis
Attorney, Agent, or Firm—Donald D. Mon

[57] ABSTRACT

Mounting device for mounting a multiple cylinder, vertical in-line 2 cycle internal combustion engine to a frame or chassis. The frame or chassis has a pair of longitudinal rails, which are laterally spaced apart. In order to reduce transmission of engine vibration to the chassis or frame, the lateral spacing apart of the rails is related to the square root of the piston displacement of one cylinder and the number of inches of one rod length.

4 Claims, 3 Drawing Sheets

MOUNTING SYSTEM FOR TWO CYCLE IN-LINE ENGINE

FIELD OF THE INVENTION

This invention relates to a mounting system for two cycle aircraft engines, with particular concern for reducing transmission of vibration to a vehicle such as an airframe.

BACKGROUND OF THE INVENTION

Private aviation airplanes have historically utilized 4-cycle power plants which have their cylinder arrangements laid out in a horizontally opposed 2,4,6 or 8 cylinder fashion. There are many reasons for this arrangement, among which are the following:

1. Commonality of parts, which lowers manufacturing costs.
2. The horizontally opposed configuration reduces vibration.
3. The "flat" configuration provides for less cowling depth, which helps reduce the flat plate aerodynamic drag area.
4. Air cooling is simplified by reducing the number of cylinders the air must flow past on either side.

From the pilot comfort standpoint however, the primary advantage of this arrangement is the nearly complete lack of vibration transmitted to the airframe during flight. On long cross country flights, power plant vibration contributes enormously to pilot fatigue. It can be such a major factor that the duration of flight will not be limited by fuel capacity, but instead by the length of time the pilot can tolerate the vibration level he is experiencing.

From the 1940's until the 1980's conventional flat opposed 4-cycle power plant installations dominated in light private aviation planes. In recent years however, less conventional powerplants have begun to be utilized. The most notable are the in-line two cycle configurations. Unfortunately, most of these 2-cycle power plants were designed for some other type of usage than aviation. In this regard, no special emphasis was placed by the manufacturer for mounting the engine in an airframe. The mounting of these engines has been quite haphazard due to this situation. This has resulted in high levels of vibration, and cracked engine mounts and airframes. Accordingly many pilots have taken a dim view of the discomfort and unreliability of the 2-cycle as a credible aviation power plant.

All of these objections notwithstanding, there is a great need for the two-cycle engines in aviation due to their light weight and much lower cost compared to conventional 4-cycle engines.

This invention provides mounting means useful with any type of vehicle, for example aircraft, boats and land vehicles of all types. Its primary use in the near future is expected to be in aircraft because the vibration situation is so important to aircraft operation.

BRIEF DESCRIPTION OF THE INVENTION

An engine mount according to this invention includes a pair of parallel spaced apart rails which are attached to the vehicle. In this example, the vehicle is an aircraft. The rails extend parallel to the airframe's direction of forward flight. Each supports a plurality of axially spaced apart bushings which in turn support a responsive elastomeric mount. The center lines of the mounts are laterally spaced apart by a reference distance.

A plurality of mounting brackets are attached to the engine, and in turn they are fixed to the elastomeric mount. They are fixed to the elastomeric mount in a plane which extends through the center line of rotation of the engine's crankshaft.

The reference spacing is related to engine parameters of piston displacement and rod length as follows:

$$\sqrt{a} + b = c$$

In this equation, a is the number of cubic inches piston displacement of one cylinder, b is the number of inches of one rod length, and c is the number of inches of the reference spacing.

As a consequence, the rocking couple vibration of the in-line cylinder configuration is substantially cancelled. In aircraft, the dynamic and gyroscopic forces of the rotating propeller assist in cancelling rather than magnifying engine vibration.

The above and other features of this invention will be fully understood from the following detailed description and the accompanying drawings, in which:

DETAILED DESCRIPTION OF THE INVENTION

This invention relates to the mounting of multi-cylinder vertical in-line two cycle engines to a vehicle. Such engines are well-known and require no detailed description here. The only dynamic parts important to this invention are a crankshaft having a center of rotation, a piston rod which has a length measured from the center line of its crankshaft bearing to the center line of its wrist bearing that joins the rod to its respective piston, and the piston displacement volume from top center to bottom center. These are so well-known as not to require illustration here.

Figure 3:
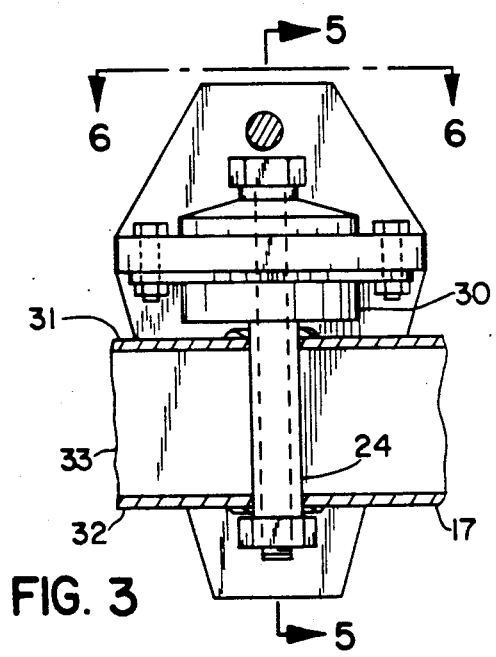
FIG. 3 is a side view, partly in cutaway cross-section showing part of FIG. 2.
Figure 4:
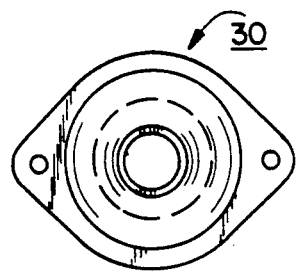
FIG. 4 is a detail of a part of FIG. 3.
Figure 2:
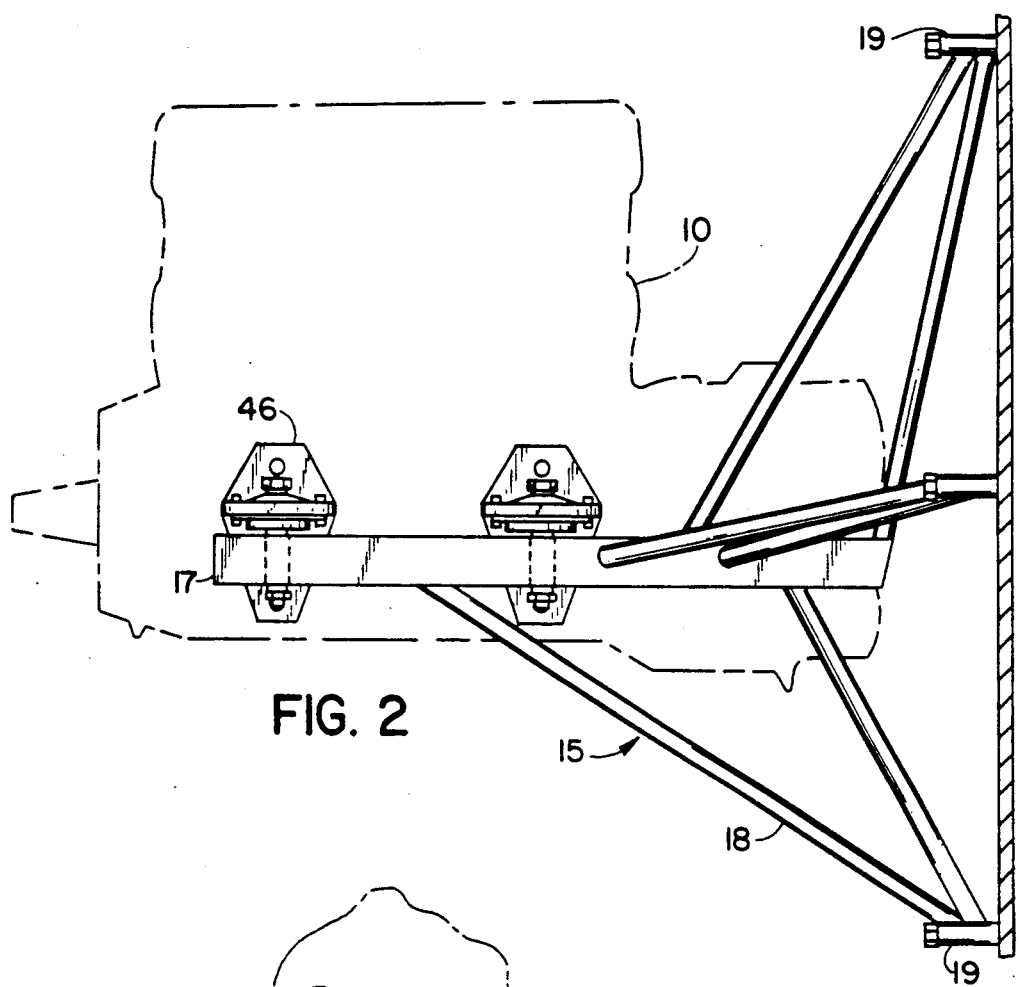
FIG. 2 is a side view of FIG. 1.

The casing 10 of an engine of this type is partially shown in dashed line notation in FIGS. 2 and 3. The crankshaft center line 12 is shown. The piston and rod are conventional, linked to the rod and to the crankshaft throws as also is so customary as not to require illustration here.

Figure 1:
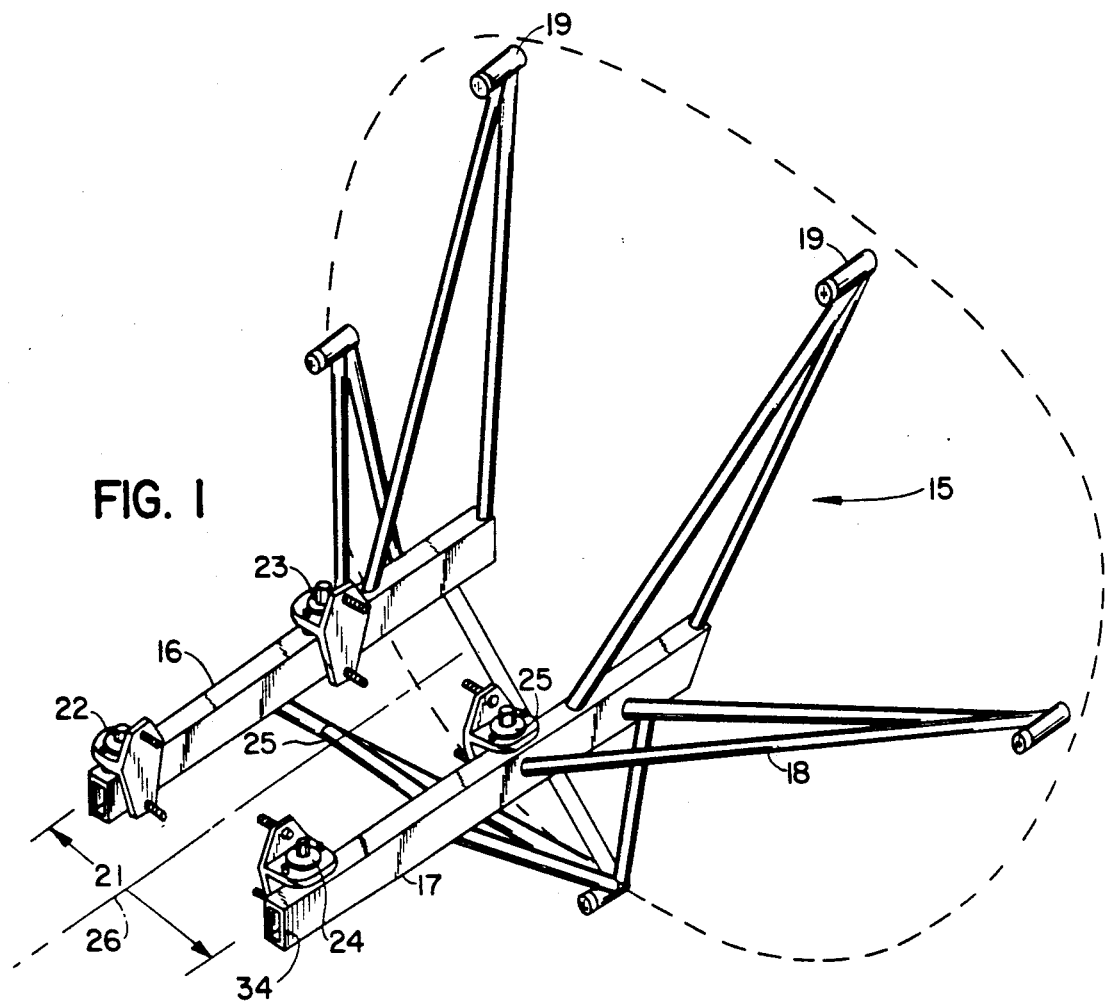
FIG. 1 is a perspective view of the presently-preferred embodiment of mounting means according to this invention.

FIGS. 1 and 2 show a truss 15 which supports a pair of rails 16,17. The truss comprises a group of rigid tubes 18 assembled in a pattern which is illustrative of one of many useful truss arrangements. Any suitable truss will include bushings 19 or other means to be used to mount the truss to the airframe, generally to the firewall, so the rails will project forwardly of the firewall. With the exception of a spreader tube 20, these tubes will generally be welded together, or to the rails, or to the bushings, so as to form a rigid supporting structure. Similar structure will be provided for other vehicles to hold the rails in a cantilever fashion.

Spreader tube 20 is preferably made adjustable in length, at least initially, in order to establish a lateral reference distance 21 between the rails, more specifically between the centers of mount bushings 22,23 on rail 16, and the centers of mount bushings 24,25 on rail 17. The spreader tube may be made of two telescoping tubes, which can be welded together after the proper lateral spacing is set, or can include any type of releasable joinder so that later adjustment can be made. In fully established manufacturing, the length of the spreader tube need not be adjustable. It will simply be formed to the correct length.

Axis 26 of forward motion of the vehicle lies in the plane of the rails, and the rails are substantially parallel to it.

Rails 16, 17 and all of the related mountings are identical, so only rail 17, mount bushing 24, and its associated elastomeric mount 30 will be described in detail.

Figure 5:
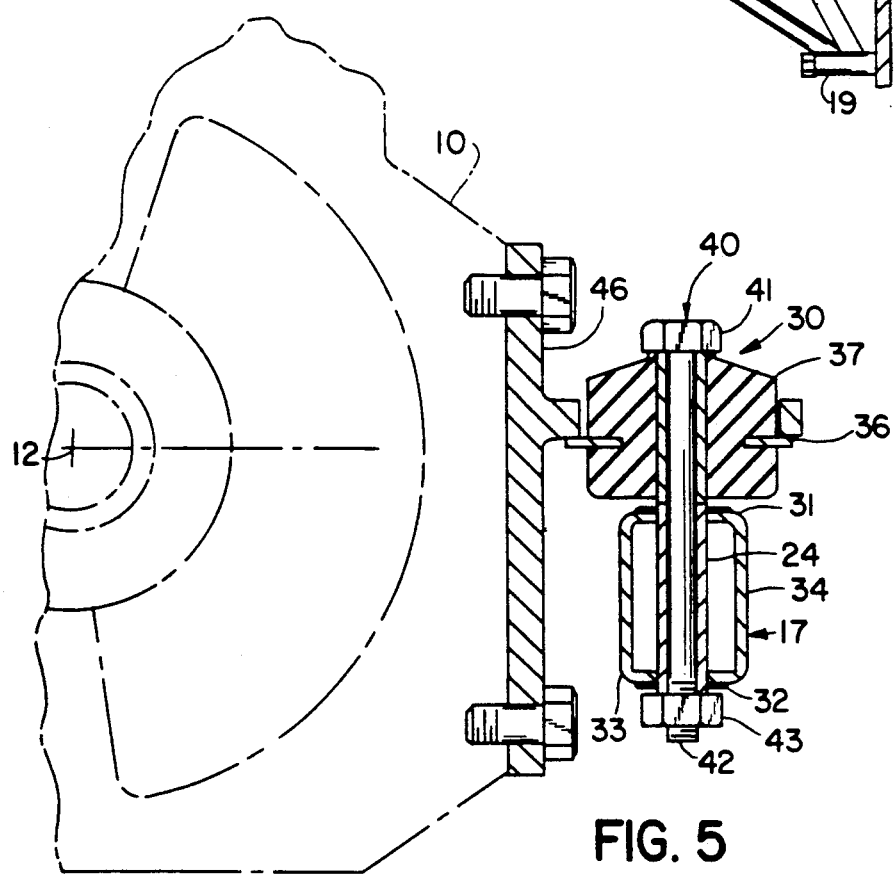
FIG. 5 is a cross section taken at line 5—5 in FIG. 3.
Figure 7:
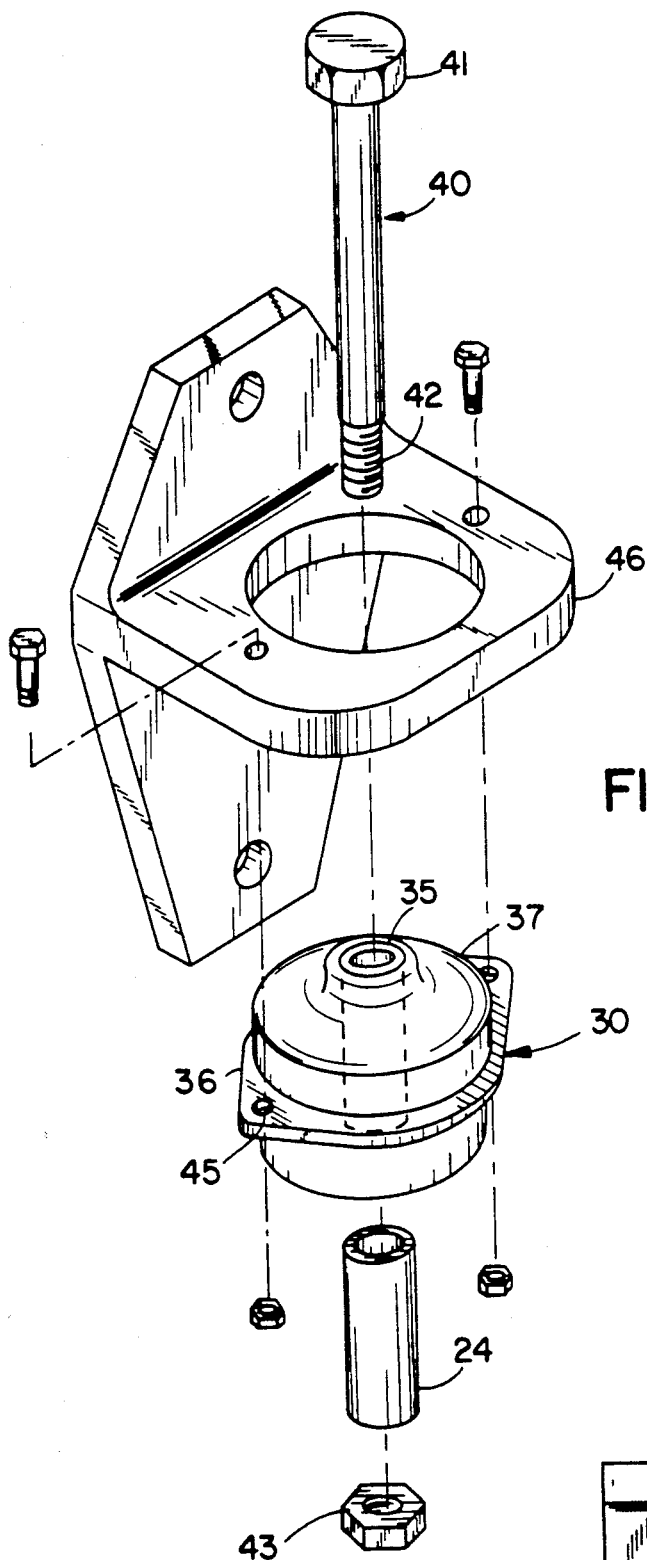
FIG. 7 is an exploded view of the mounting means of FIG. 2.
Figure 6:
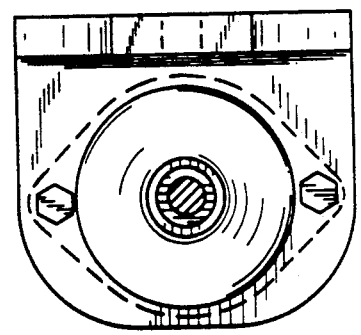
FIG. 6 is a partial top view taken at line 6—6 in FIG. 3.

As best shown in FIGS. 1, 3 and 5, the rail is a box beam having a top 31, bottom 32 and sidewalls 33,34. Mount bushing 24 passes through the top and bottom, and is welded to them. It projects above the top.

Elastomeric mount 30 includes a central bushing 35, a rigid plate 36, and an elastomeric body 37. Bushing 35 and plate 36 are bonded to elastomeric body 37. They make no contact with one another.

A mounting bolt 40 passes through bushings 22 and 35. It has a head 41 and threads 42. A nut 43 is threaded onto the bolt, thereby holding the elastomeric mount to the rail.

Plate 36 has a flange 45 which is rigidly bolted to a rigid bracket 46 that is fixed to the engine casing. Importantly, the plane of plate 36 intersects the axis of rotation of the crankshaft, and mount bushing 35 is normal to the plane of the plate. The cylinders are vertically aligned, using the plane established by the rails as a "horizontal" reference.

Persons skilled in the art will recognize that the elastomeric properties of the mount will be related to the weight and anticipated frequencies to which it will be subjected. Some trial and error will be required to select the best elastomer and its dimensions. However, for one two cylinder vertical in-line engine weighing about 70 pounds, the following approximate properties and dimensions have been found suitable for the mount. Elastomer 52 durometer; 1.5 inches outer diameter; 7/16 inches inner diameter; 1 inch thick.

The mount bushings are laterally spaced apart by a distance in inches derived from the following formula:

$$\sqrt{a} + b = c$$

In this equation, a is the number of cubic inches piston displacement of one cylinder, b is the number of inches of one rod length, and c is the number of inches of the reference spacing.

In the instant example, the number of cubic inches piston displacement of one cylinder is 15.5, the number of inches of length of a piston rod is 4.6, and the number of inches of the reference spacing is 8.5. The longitudinal spacing of the bushings along each rail is less critical. In this example it is about 10 inches.

With the foregoing example in mind as well as the criteria expressed, a person skilled in the art can readily calculate the dimensions and properties of this system for other engines.

This mounting system provides a useful mount for 2 cycle engines which importantly reduces vibrations transmitted to a frame or chassis.

This invention is not to be limited by the embodiment shown in the drawings or described in the description which is given by way of example and not of limitation, but only in accordance with the scope of the appended claims.

I claim:

1. Mounting means to mount a multiple cylinder, vertical in-line 2 cycle internal combustion engine to a frame or chassis, said frame or chassis having a nominal axis of forward movement, said engine having a casing, a crankshaft with a center of rotation, and a piston rod having a rod length between the centers of its bearings, and a piston reciprocated by said crankshaft and piston rod, said mounting means comprising:

a pair of parallel, laterally spaced apart rails; means mounting said rails to said frame or chassis; spacer means spacing said rails laterally apart from one another;

mounting bushings, a plurality of which are rigidly fixed to each of said rails, said bushings being axially aligned in pairs on each rail, and spaced laterally apart between said rails by a reference distance between their centers, said reference distance in inches being determined by the following formula: $\sqrt{a} + b = c$, in which a is the number of cubic inches piston displacement of one cylinder, b is the number of inches of one rod length, and c is the number of inches of the reference spacing;

an elastomeric mount comprising an elastomeric body, a tubular bushing, and a mounting plate, said tubular bushing and mounting plate being separate from one another, and bonded to said elastomeric body;

fastener means holding each tubular bushing to a respective mounting bushing;

second fastener means holding each mounting plate to the engine casing;

the said mounting plate having a plane which incorporates said axis of rotation.

2. Apparatus according to claim 1 in which said rails have a first end and a second end; said first end being fixed to said frame or chassis; the second end being unsupported, whereby the rails are cantilevered.

3. Apparatus according to claim 2 in which a truss holds the rails to the frame or chassis.

4. Apparatus according to claim 1 in which adjustable spreader means extends between and interconnects said rails so as adjustably to position said rails to the said reference distance.

* * * * *